United States Patent [19]

Rosen

[11] 3,939,932
[45] Feb. 24, 1976

[54] EXERCISE APPARATUS

[76] Inventor: Henri E. Rosen, 67 Long Wharf, Boston, Mass. 02110

[22] Filed: July 22, 1974

[21] Appl. No.: 490,588

[52] U.S. Cl. ................ 180/33 C; 73/379; 272/73
[51] Int. Cl.² ........................................ B62K 11/00
[58] Field of Search .... 180/33 C, 33 R, 65 R, 65 A, 180/25 R, 34; 272/73; 73/379; 128/25 R

[56] References Cited
UNITED STATES PATENTS

| | | | |
|---|---|---|---|
| 2,788,211 | 4/1957 | Ivanoff | 272/73 |
| 2,917,122 | 12/1959 | Quisenberry | 180/25 R |
| 3,192,772 | 7/1965 | Tarter | 73/379 |
| 3,513,928 | 5/1970 | Emmons | 180/65 R |
| 3,598,195 | 8/1971 | Stellar | 180/65 A |
| 3,670,723 | 6/1972 | Simjian | 272/73 |
| 3,713,502 | 1/1973 | Delaney | 180/65 R |
| 3,759,339 | 9/1973 | Farrow | 180/65 R |
| 3,773,131 | 11/1973 | Jaulmes | 180/33 C |
| 3,827,519 | 8/1974 | Snider | 180/65 R |

FOREIGN PATENTS OR APPLICATIONS

| | | | |
|---|---|---|---|
| 443,948 | 9/1967 | Switzerland | 180/33 C |

*Primary Examiner*—M. Henson Wood, Jr.
*Assistant Examiner*—Jack D. Rubenstein

[57] ABSTRACT

A combination pedal and motor powered bicycle "moped" having a chain tension sensor attached to the throttle so that the rider can control the power output of the motor by the degree of force he exerts in pedalling.

12 Claims, 6 Drawing Figures

EXERCISE APPARATUS

This invention relates to motor vehicles and the like having associated therewith operator exercise apparatus and, more particularly, to such apparatus used in conjunction with a motor vehicle in such a way that the power output of the motor may be made to depend on physical use of the exercise apparatus by the operator of the vehicle.

It is well-known that the widespread use of motor vehicles has contributed to many of today's health and physical fitness problems. The growing general awareness of the importance of this problem, together with economic, environmental and other considerations has led to a marked increase in the use of bicycles for exercise, pleasure and basic transportation during the last few years. The bicycle, however, has some disadvantages not completely taken care of by lightweight modern design and multiple gears, particularly in hot or hilly areas, or where heavy baggage, longer distances or physical infirmities are involved.

One very successful answer to these problems has been found in the "moped," or combination motor and pedal powered bicycle, which uses conventional pedalling to start the motor and if necessary, to help in going up hills. Being motor- powered, the moped designs can afford greater comfort and safety since the weight factors are less critical than in bicycles, with the result that most moped designs offer a better combination of bigger tires, better braking and suspension, lighting and seating than is possible with the bicycle. As the speed of the moped increases however, the relative contribution to this speed by the pedalling tends to decrease and in consequence, the rider most of the time neither needs nor chooses to pedal and thus largely loses the benefit of exercise he would have received with a bicycle.

Since many of those who might benefit from increased exercise lack the time or discipline necessary to follow a regular program, these people in particular could be helped by having a practical motor vehicle available that could be adjusted to give a degree of healthy bicycle-like pedalling exercise, while at the same time being able to offer with the aid of its motor a degree of comfort, range, acceleration, baggage capacity and safety in general traffic situations far superior than that afforded by the bicycle.

A typical application is found in commuting, where the commuter could exercise while commuting, and could not only go farther with less work, but could actually pre-select the degree of exercise he preferred for the commute and lock in the setting if necessary, to prevent the temptation of cutting down on his plan enroute; if he chose a lesser degree of exertion, for any reason, he would still suffer no loss in the performance of his machine by such a choice. With a well-mufflered machine, one could return to the quiet pleasures of the bicycle without having to face its discomforts and drudgery, and it is likely that under such conditions, one might well experience a significant increase in the motivation to exercise in this way, which would be really getting at the root of the problem.

While the discussion that follows will deal with the application of this invention to the moped, it is in no sense intended to be limited thereto; rather, it is intended to have application to a wide range of motor vehicles including motorcycles, powered tricycles, motorcars, motorboats, sno-mobiles, and the like, and a variety of exercise motions, including a rowing motion, for a combination of motorized transporation and exercise, wherein the exercise of the operator is necessary to the power output of the motor of the vehicle.

In general, this is accomplished, according to the invention, by providing a powered vehicle having operator exercise apparatus, comprising motor operated power means providing motive power for the vehicle, control means, such as a throttle, for controlling the effective power output of the motor operated power means, physical exercise means for application of vehicle operator applied force thereto and means to regulate the speed of the vehicle when under power responsive to the degree of force exerted by the exercising operator, comprising, preferably, force sensing means for the exercise means, the force sensing means being connected to the control means for varying the power output from the motor operated power means responsive to varying operator force applied to the exercise means.

The control means preferably operates by throttle adjustment, but could obviously be accomplished by a similar control of one or more of the elements affecting the vehicle's speed, including selective braking, timing adjustment, choke adjustment, gearing, electrical system control, and the like.

Adjustable means are also preferably provided whereby the operator can select the range of physical exercising effort he prefers, and whereby he can also elect to operate the vehicle either as a conventional bicycle or as a moped if he so desires.

The control means may be provided with manual actuating means and selection means may be provided for selective operation of the control means by the force sensing means. The physically operable exercise means preferably includes foot pedal means, as with a conventional bicycle or tricycle but may include other types of foot motion and further alternative means as noted above.

For the purpose of more fully describing the above and still further objects and features of the invention, reference is now made to the following detailed description thereof, together with the accompanying drawings, wherein.

Figure 1:
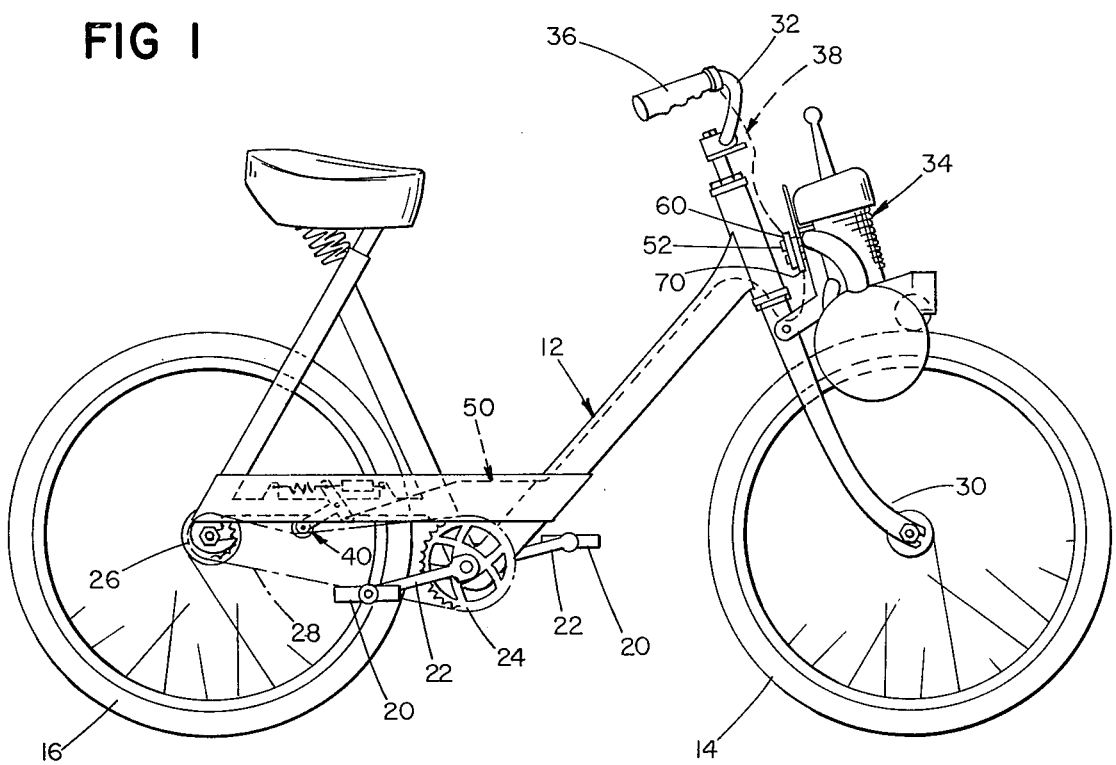
FIG. 1 is an overall side view of a combination motor and pedal bicycle according to the invention.

Referring to the drawings, and particularly to FIG. 1 thereof, a Velosolex 3800 combination motor and pedal bicycle, manufactured by Velosolex, 68 bd de Verdun, 92-Courbevoie, France; modified according to the present invention, is illustrated therein. Conventionally, such vehicle has, mounted on its frame 12, a steerable front wheel 14 and rear wheel 16. Rear wheel 16 is driven by foot pedals 20 having crank arms 22 connected to front sprocket 24 which drives rear sprocket 26 through chain 28 in the usual manner. A coaster brake may be provided. Front wheel 14, mounted in front fork 30 and steered by handlebars 32, is frictionally driven by a gasoline motor 34 mounted on front fork 30 above front wheel 14. Motor 34 has a throttle control, hereinafter more fully described, which in its conventional operation may be manually actuated by a rotatable handlegrip 36 and a connecting cable 38. Other types of powered cycles, such as tricycles, are similar.

Figure 2:
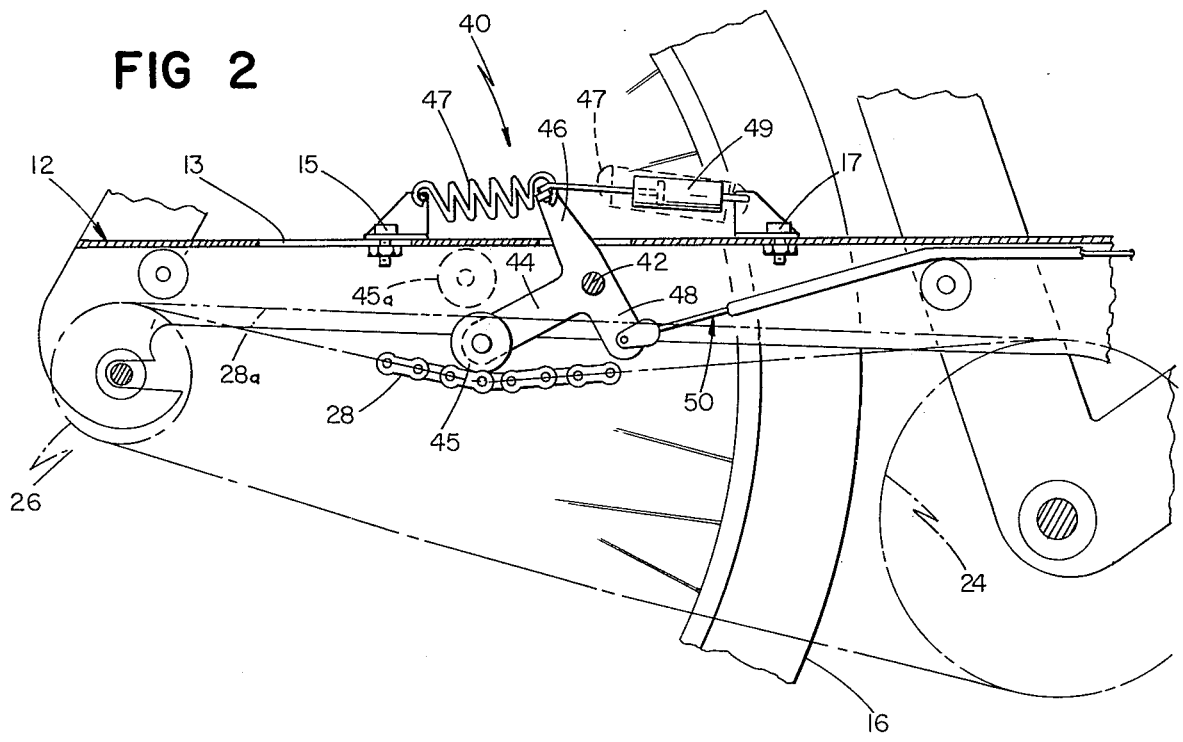
FIG. 2 is a detail side view of the bicycle of FIG. 1, illustrating the exercise and force sensing elements thereof.

According to the present invention, the above described bicycle is provided with a chain tension force sensing device, generally designated 40 and illustrated in FIG. 2, connected to the motor throttle control for varying the power output from the motor responsive to varying chain tension as the rider pedals with varying force. More specifically, device 40 includes a three arm lever pivotally mounted on frame 12 by its shaft 42, its operating arm 44 carrying a roller 45 for contacting the upper surface of the upper flight of chain 28, its upper arm 46 being connected to spring 47 attached to frame 12 for urging said roller into contact with said chain, and its lower arm 48 carrying control cable 50 for connection to the throttle control of motor 34. A bolt 15 slideably mounted for adjustment in a slot 13 in frame 12 is provided for connecting spring 47 to frame 12 in its operative exercise mode position, said slot providing for operator selection of the range of exercising force to be applied to operate the vehicle under power at varying speeds. A bolt 17 is provided for connecting spring 47 to frame 12 in its inoperative position, bolts 15 and 17 thus providing selective operation of chain sensing device 40. A fluid damper 49 may also be connected between upper arm 46 and frame 12 by bolt 17 for smoothing out pedalling irregularities and possibly for simulating a coasting type deceleration. Other types of sensors may be employed and will be needed with other types of drive mechanisms.

Figure 3:
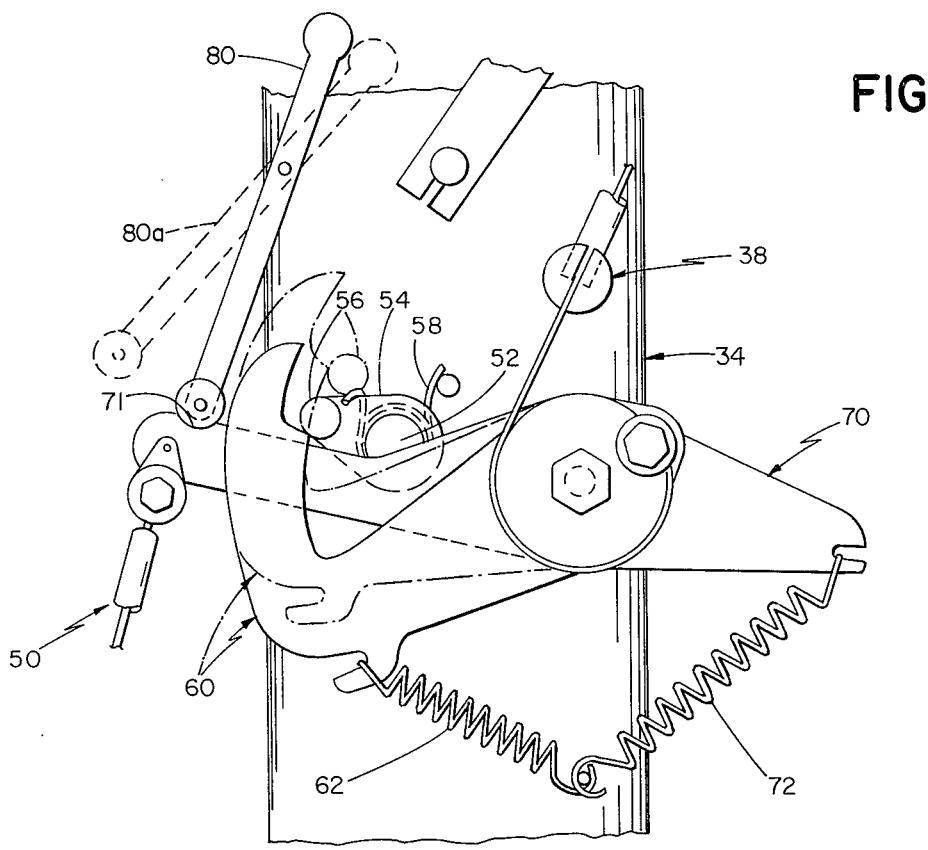
FIGS. 3 through 6 are detail views of the bicycle of FIG. 1 illustrating various situations in the operation of the throttle control elements thereof.
Figure 4:
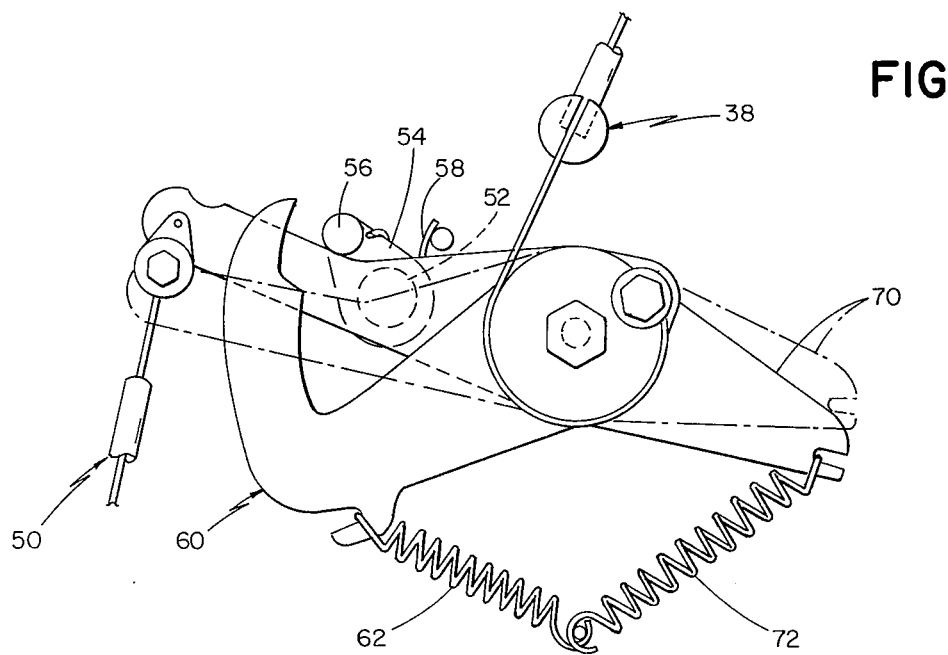
Figure 5:
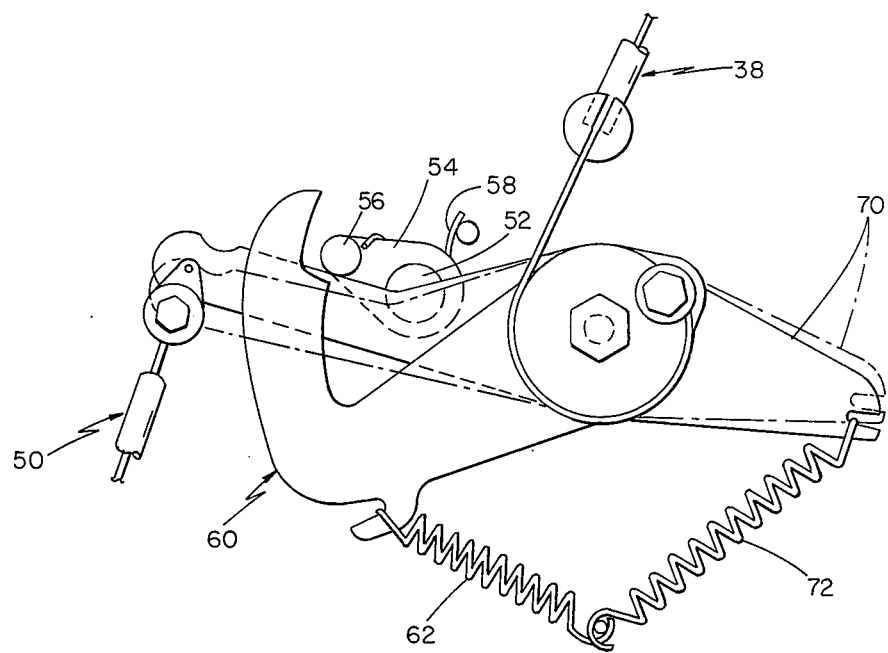
Figure 6:
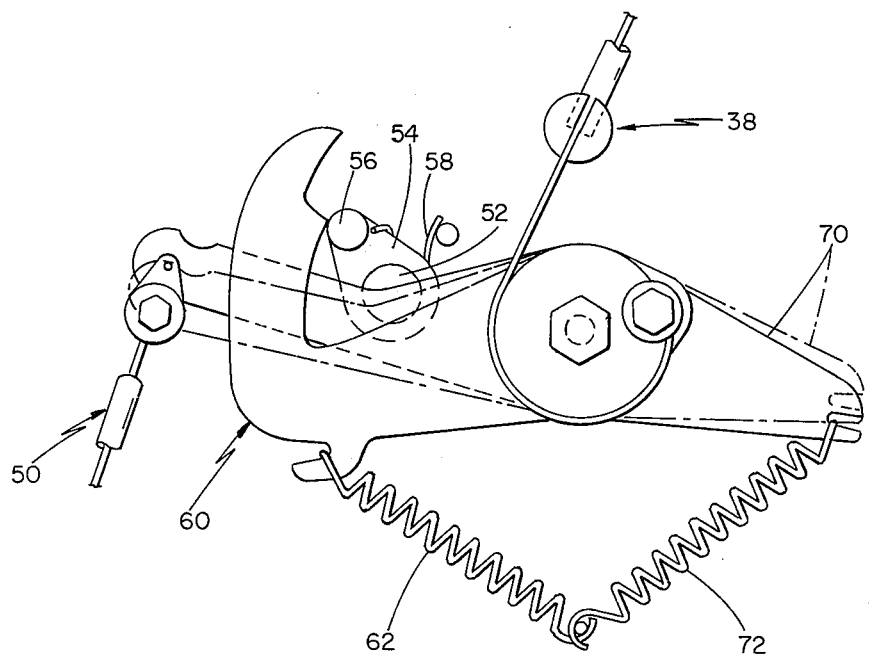

The modified throttle control of the invention, mounted on motor 34 and to which control cable 50 is connected, is shown in detail in FIGS. 3 through 6. A throttle shaft 52, urged into its open position (FIGS. 3 and 5) by spring 58, in a counter clockwise direction as shown in the drawings, carries an arm 54 having a cam follower 56 which is operated by one of two cam levers 60 and 70 rotatably mounted on motor 34. Curved cam handgrip lever 60 is rotated by handgrip control cable 38 in opposition to its spring 62. Straight tension control cam lever 70 is rotated by tension device control cable 50 in opposition to its spring 72. The cam surfaces of said levers control the rotary position of throttle shaft 52 and hence the power output of motor 34 through cam follower 56 which is maintained in contact with at least one of said levers from its open position as shown in FIGS. 3 and 5; to its closed position, as shown in FIGS. 4 and 6.

Alternatively to moving spring 47 from bolt 15 to 17 to deactivate chain sensing device 40, or in combination therewith, a selection lever 80 may be pivotally mounted on motor 34 as shown in FIG. 3 to engage detent 71 of tension control cam lever 70 to maintain it in inoperative position, said selection lever 80 being moveable to its position 80a shown in dotted lines in FIG. 3 to permit tension control cam lever 70 to be operated by chain tension force sensing device 40.

In conventional operation, that is, with tension device spring 47 connected to frame 12 by forward bolt 17 or with selection lever 80 engaged with detent 71 of cam lever 70, the control of the power output of the motor is entirely by the handgrip 36 through its cable 38 and lever 60, as shown in FIG. 3, in which the throttle shaft 52 is illustrated in its open position by the full line position of lever 60 and in its closed position by the dash-dot position of lever 60.

In the exercise mode according to the present invention, with spring 47 connected to bicycle frame 12 as shown in FIG. 2, selection lever 80 disengaged from lever detent 71 and handgrip lever 60 in its full throttle position (FIGS. 4 and 5), the rotary position of tension device 40, as established by the tension in the upper flight of chain 28 and the adjustment of bolt 15 in slot 13, controls the rotary position of tension control cam lever 70 and hence throttle shaft 52. In the full line position of chain roller 45 in FIG. 2, chain 28 is slack so that the throttle shaft 52 is closed and in its dotted line position chain 28 is tensioned (or roller 45 has been positioned in its inoperative position as explained above).

Referring first to FIG. 4, with the chain 28 in slack position without operator force applied thereto, chain roller 45 will assume its full line position as shown in FIG. 2 and position chain tension cam lever 70 in its full line position in FIG. 4 to close the throttle, the inoperative position of said lever 70 being shown in dot-dash lines in said FIG. 4.

In FIG. 5, rotation of tension device 40 to its dotted position in FIG. 2 by application of operator force to cause chain 28 to assume its tensioned position at 28a has caused cable 50 to rotate lever 70 to allow throttle shaft 52 to open under the influence of its spring 58, and the degree of such opening is proportional to the amount of force the bicycle rider applies to the pedals, — as he pedals harder, the motor will provide an increased power output.

FIG. 6 illustrates that, regardless of the tension in chain 28, handgrip 36 is still effective to move throttle shaft 52 to its closed position.

What is claimed is:

1. A vehicle having at least one traction wheel and foot peddling exercise means connectable to said wheel comprising:
    motor operated power means providing motive power for said vehicle;
    control means for variably controlling the effective motive power output of said motor operated power means to drive said vehicle at variable speed;
    said foot pedalling exercise means including a pair of pedals operable by the application of pumping force thereto by the vehicle operator;
    drive means for connecting said exercise means said traction wheel to apply as motive power thereto independently of said motor operated power means, the pumping force exerted by the operator on said exercise means;
    force sensing means for sensing the pumping force applied by the operator to said pedals independently of the pumping speed thereof; and
    connecting means for connecting said force sensing means to actuate said control means to vary the effective motive power output from said motor operated power means responsive to varying operator pumping force applied to said pedals for driving said vehicle at varying speed while said exercise means and said traction wheel are connected by said drive means.

2. A vehicle as claimed in claim 1 which includes adjustment means for varying the response of said force sensing means to pumping force applied to said exercise means.

3. A vehicle as claimed in claim 1 wherein said drive means includes a chain and sprocket connection between said exercise means and said traction wheel, and said sensing means senses the tension of said chain.

4. A vehicle as claimed in claim 1 which includes operator adjustable means for actuating said control means, and selection means for selectively operatively connecting said operator adjustable means and said connecting means to actuate said control means.

5. A vehicle as claimed in claim 4 wherein said selection means is operable to connect said connecting means to actuate said control means while inhibiting actuation of said control means by said operator adjustable means.

6. A vehicle as claimed in claim 4 wherein said selection means includes means for inhibiting operative connection of said connecting means to said control means.

7. A vehicle as claimed in claim 4 wherein said control means is a throttle for the motor of said motor operated power means.

8. A vehicle as claimed in claim 1 wherein said drive means directly connects said exercise means and said traction wheel to apply directly as motive power to said traction wheel the pumping force applied by the operator to said pedals.

9. A vehicle having at least one traction wheel and operator exercise apparatus connected thereto, comprising:
  motor operated power means providing motive power for said vehicle;
  control means for controlling the effective power output of said motor operated power means;
  manual actuating means for said control means;
  foot pedalling exercise means including chain and sprocket means for application of vehicle operator applied force thereto;
  drive means for connecting said exercise means to said traction wheel to apply directly as motive power thereto the pumping force exerted by the operator on said exercise means;
  force sensing means for sensing the tension of said chain for said manually operable exercise means; and
  selection means for selective operation of said control means by said force sensing means in an exercise mode;
  said force sensing means in said exercise mode sensing the tension of said chain and being connected to said control means for varying the power output from said motor operated power means responsive to varying operator force applied to said foot pedal exercise means while said pumping force is simultaneously applied directly to said traction wheel.

10. A combination pedal and motor cycle having front and rear wheels
  a motor providing motive power for driving one wheel of said cycle
  a throttle for controlling the power output of said motor
  actuating means for said throttle
  a pair of foot pedals for providing motive power for driving the rear wheel of said cycle and
  chain tension sensing means connected to said throttle for varying the power output from said motor responsive to increasing chain tension.

11. A combination motor and pedal cycle having front and rear wheels comprising;
  a motor providing motive power for said cycle;
  a throttle for controlling the power output of said motor;
  manual actuating means for said throttle;
  foot operable power means including chain and sprocket means for driving said rear wheel by said pedals for direct application of cycle rider applied force thereto providing motive power for said cycle;
  force sensing means for said foot operable means for sensing the tension of said chain; and
  selection means for selective operation of said throttle by said force sensing means in an exercise mode;
  said force sensing means in said exercise mode sensing the tension of said chain and being connected to said throttle for varying the power output from said motor responsive to varying operator force applied to said foot operable power means while said force is simultaneously applied directly to said rear wheel.

12. A combination motor and pedal cycle having front and rear wheels
  a motor for providing motive power for driving one of the wheels of said cycle
  a throttle for controlling the power output of said motor
  manual actuating means for said throttle
  a pair of foot pedals having rotatable crank arms and a chain and sprockets for providing motive power for driving the rear wheel of said cycle and
  chain tension sensing means connected to said throttle for increasing the power output from said motor responsive to increasing chain tension.

* * * * *

UNITED STATES PATENT AND TRADEMARK OFFICE
CERTIFICATE OF CORRECTION

PATENT NO. : 3,939,932
DATED : February 24, 1976
INVENTOR(S) : Henri E. Rosen

It is certified that error appears in the above—identified patent and that said Letters Patent are hereby corrected as shown below:

Column 1, line 30, "moped" should be quoted;

Column 1, line 33, "moped" should be quoted;

Column 1, line 64, "moped" should be quoted;

Signed and Sealed this

Sixth Day of July 1976

[SEAL]

*Attest:*

RUTH C. MASON
*Attesting Officer*

C. MARSHALL DANN
*Commissioner of Patents and Trademarks*